Patented Nov. 28, 1944

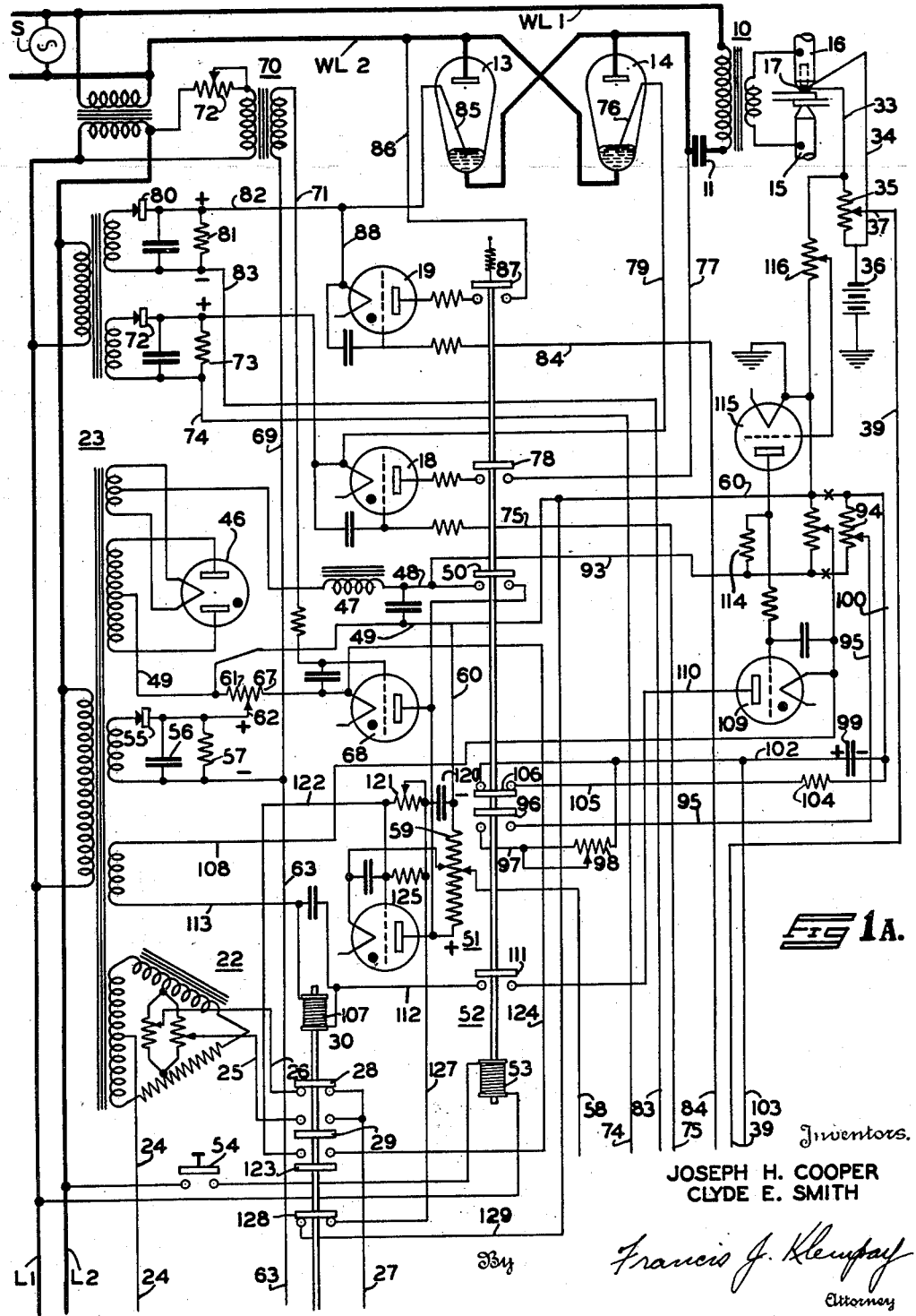

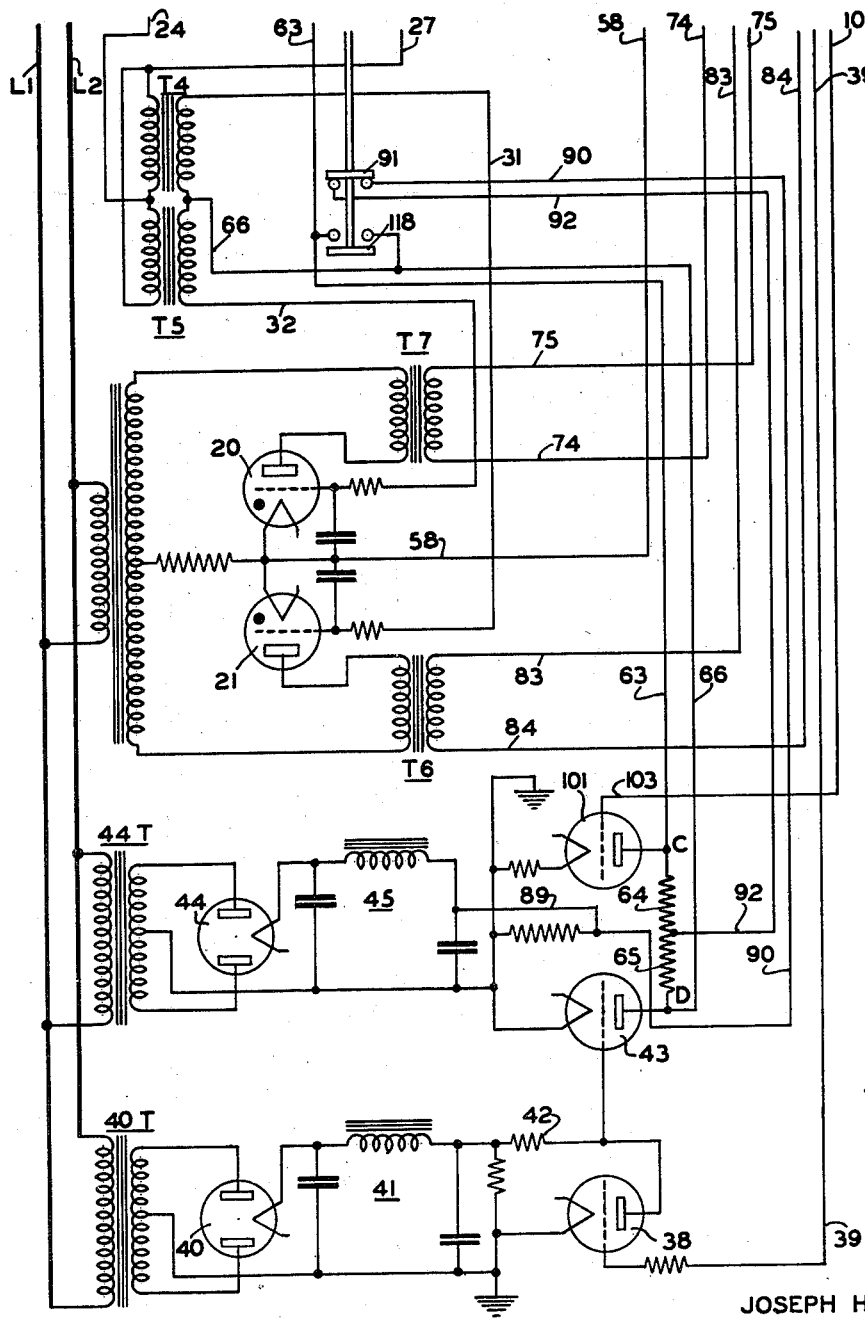

2,363,719

UNITED STATES PATENT OFFICE 2,363,719

WELDING METHOD AND APPARATUS

Joseph H. Cooper, Warren, and Clyde E. Smith, Port Homer, Ohio, assignors to The Taylor-Winfield Corporation, Warren, Ohio, a corporation of Ohio Application November 5, 1942, Serial No. 464,602

28 Claims. (Cl. 219—4)

This invention relates to the art of welding metals and more particularly to improved methods and devices for controlling the application of heat to the point or zone of weld.

While heretofore various systems have been devised and employed to control the application of heat in electric resistance, arc and flame welding, such systems have utilized as their primary operational factors the furnishing of a predetermined quantity of heat or heating energy for a predetermined length of time or alternatively the furnishing of heat or heating energy in a more or less uncontrolled manner until the final desired welding temperature is attained in the work. It is at once apparent that these methods do not take into consideration the physical resistance to heat transfer or in the case of electric resistance welding, at least, the ohmic resistance and reactive impedance affecting the rate of energy transfer as well as the physical resistance to heat transfer. Consequently in systems employing a timed heat input cycle the optimum temperature in the work may or may not be attained depending on the presence and variations in a substantial number of normally uncontrollable factors.

The above mentioned factors are affected by the thickness and surface condition of the work, the area and condition of the welding electrodes, the welding pressure applied, the metallurgical analysis and character of the metal of the work as well as the physical nature or form of the pieces being welded. Regarding the latter it is now understood that the heat or current flow is localized at the desired point or area to a degree dependent on the existence of adjacent low resistance path areas or zones. For example, if the weld is to be made in the center of large heavy sheets the localization of heating will be much less than if the weld be made at an edge of the work, it being assumed that the same quantity of heat or energy is furnished in each case. Also in the case of electric resistance welding the position of magnetic work materials in the throat of the welding machine materially affects the quantity of energy delivered to the work by reason of the variation in impedance in the welding load circuit.

The primary object of the invention is the provision of improved methods and devices for controlling the application of heat in metal welding operations whereby the presence of and variations in the above mentioned normally uncontrollable factors does not and cannot affect the uniform quality attained in the completed welds. This object is accomplished primarily, in accordance with the present invention, by varying the rate of heat input in accordance with the instantaneous rate of temperature rise at the point of weld whereby the optimum final desired welding temperature is always attained within a practicable period of time regardless of the effect of the specifically mentioned mitigating factors.

In welding certain metals, particularly hardenable steels which require an annealing operation immediately following the welding operation, it is considered desirable that the effective rate of temperature rise in attaining the welding temperature be kept substantially constant at a predetermined value in order that the weld will have uniform and desired physical characteristics at the end of the complete operation. Also the attainment of the optimum welding temperature within a practicable interval of time is highly desirable in that the welding machine may be maintained in operation at its most efficient rate of production.

A further object of the invention, therefore, is the provision of an improved system for controlling the flow of heat or heating energy into the work at the point of weld wherein the optimum welding temperature is always attained within a predetermined time interval. This general object is accomplished, in accordance with the present invention, by comparing a condition responsive to the temperature attained at the point of weld in any particular instant with a condition variable according to time and varying the rate of heat input in a manner tending to maintain a balance between the said two conditions.

A further and more specific object of the invention is the provision of an improved method for welding hardenable steels which, as pointed out above, require the application of an annealing cycle or operation following the completion of the actual welding operation. The annealing may be accomplished in different ways, depending on the final result desired, the physical characteristics of the steels, and the form of the mass of the work. For example, immediately upon the attainment of the optimum welding temperature heat may be supplied at a lower rate for annealing purposes or the supply of heat may be discontinued entirely at this time until the temperature at the weld has dropped to a desired annealing temperature after which heat or heating energy is controllably supplied to maintain this desired annealing temperature for a predetermined interval of time. Regardless of the particular manner in which the annealing is effected substantially improved results are attained by maintaining a predetermined rate of temperature rise during the welding operation.

A still further object of the invention is the provision of a system for controlling the flow of heating energy to a welding load which is operative to carry out, in a practical manner, the methods of operation outlined above. The system may, of course, assume many different forms and utilize various equivalents in each of the various essential parts but in general the system may be considered as comprising means to govern the rate of heat or heating energy input, and a control therefor including means to actually sense the temperature of the work at the point of weld and further including a time reference element whereby all heating energy furnished is always sufficient to effect a predetermined rate of temperature rise. In a more specific aspect the system may include a further timing element to provide an annealing period of predetermined duration.

The principles outlined above as well as the stated objects and advantages of the invention will be better understood upon a consideration of the following detailed specification and the accompanying drawings, wherein there is specifically disclosed certain practical embodiments of the invention. Further objects and advantages will become apparent upon a better understanding of the broad and specific features of the invention. The scope and extent of the invention itself, however, both as to method and apparatus, are delineated in the appended claims.

In the drawings:

Figure 1, consisting of parts 1A and 1B, is a schematic diagram of a welding current control system embodying the principles of the invention;

Figure 2:
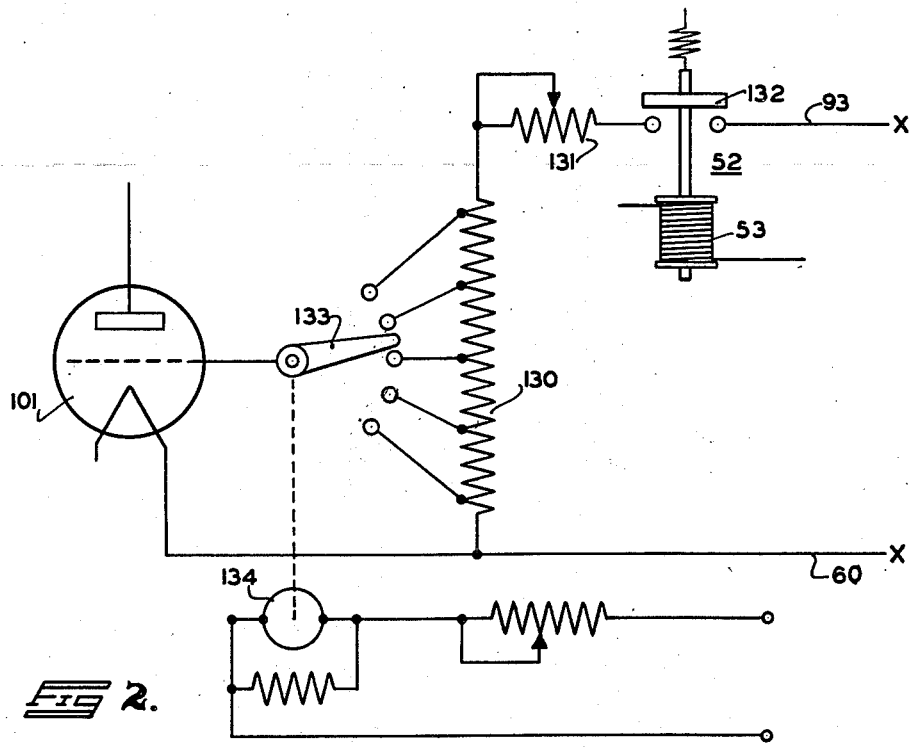
Figure 2 is a modification of a portion of the systems of Figure 1.

To illustrate the practical application of the principles of the invention we have chosen the problem of controlling the flow of current from an alternating current source to a resistance welding load but it should be understood that the invention, in its broader aspects, is not limited in its applicability to any particular heating energy source or to any particular method of applying the energy to the work. The temperature of the work at the point or zone of weld may be measured by any suitable device—a thermocouple or photocell responsive to infrared radiations, for example—and various forms of intermediate controls may be employed.

In the preferred and illustrated embodiment of the invention, however, a pair of electronic or space discharge devices 13 and 14, connected in inverse parallel, are provided to control the flow of current from an alternating current source S through the primary winding of the welding transformer 10. In series with the source and primary a capacitor 11 may be inserted to correct the power factor of the welding load if desired. The secondary winding of transformer 10 is connected to the electrodes 15 and 16 of a resistance welding machine and incorporated or built into the electrode 16, in any suitable manner, is a thermo-couple 17 the function of which is to measure the temperature of the work at the point or zone of weld.

The discharge devices 13 and 14 are preferably of the mercury arc type employing an ignition or starting electrode in addition to an anode and a mercury pool cathode. In accordance with usual practice the ignition electrodes are energized in controlled phase relation with the line voltage by means of secondary or control discharge devices 19 and 18, the plate circuits of which are arranged to be connected with the ignition electrodes of the respective discharge devices 13 and 14. Discharge devices 18 and 19 are preferably of the grid controlled gas filled type known commercially as Thyratrons. In the manner to be hereinafter more fully explained conduction in the Thyratrons 18 and 19 and consequently in the valves 13 and 14 is controlled by operation of the relay devices 20 and 21 which are also preferably of the gas filled electronic discharge type. As is well understood in the art the length of the conduction period in the devices 20 and 21 in each cycle of the alternating line current is a function of the resultant of the impressed direct and alternating components of the grid biasing voltage, taking into account the phase relation of the alternating component. In accordance with the preferred and illustrated embodiment of the invention these variable factors are utilized and controlled to effect the desired method of operation as above outlined.

A base control of the quantity of current flow to the welding load is obtained by shifting the phase of the alternating component of the grid bias impressed on the space discharge devices 20 and 21 with respect to their plate voltages and this is accomplished by employing a phase shifting device 22 which is connected to the supply line L1, L2 through the transformer 23. Conductors 24, 25 and 26 lead from the phase shifting device 22 and the device is so adjusted that the alternations in the circuit 24, 25 is closer in phase with the alternations in the principal source S than are the alternations in the circuit 24, 26. Common conductor 24 is connected to an end terminal of the primary winding of each of two transformers T4 and T5. The other terminals of primary windings of transformers T4 and T5 are arranged to be alternately connected to conductors 25 and 26 by means of the conductor 27 and the contactors 28 and 29 of the relay 30, the function and operation of which will be explained below. The secondaries of transformers T4 and T5, in series with a controlled source of direct current biasing potential to be hereinafter more fully explained, furnish the alternating component of the grid biasing potential for the discharge devices 21 and 20, respectively, through the conductors 31 and 32, respectively. Thus it should be apparent that, assuming a constant direct current component of grid biasing potential, the period of conduction during each half cycle in the discharge devices 20 and 21 will be determined first, by whether the conductor 25 or 26 is connected to the transformers T4 and T5 and secondly, the adjusted angle of phase deviation existent in the particular conductor (25 or 26) connected to these transformers.

Figure 3:
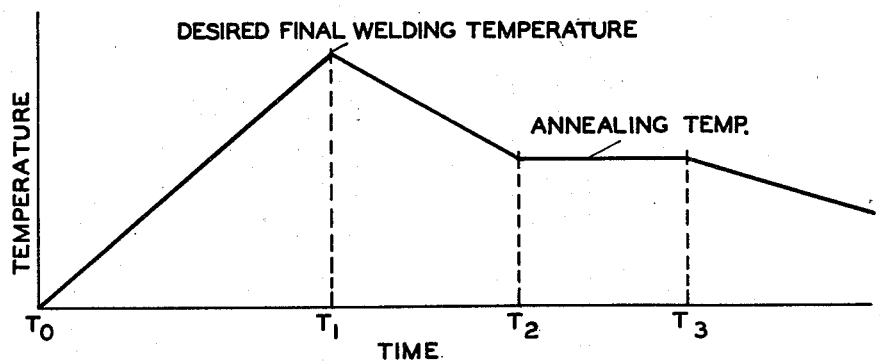
Figure 3 is a temperature-time graph of a combined welding and annealing operation which may be followed while employing the main principles of the present invention.

The direct current component of the grid biasing voltage for the discharge devices 20 and 21 varies in value in accordance with the deviation of a predetermined fixed relation of the temperature attained at the point of weld with respect to time as measured from the initiation of the welding cycle. Thus, a control based on the rate of temperature rise is effected. In operation, this control is effective until the final desired welding temperature is reached (time T1) after which the weld may be allowed to cool down to a predetermined desired temperature, which temperature is maintained for a predetermined desired length of time, all as indicated in Figure 3. The circuits resulting in the constant rate of temperature rise during the period T0—T1 will now be described.

The leads 33 and 34 of the thermo-couple 17 are connected to the end terminals of potentiometer 35, one end of which is connected to ground through a battery 36. The tap 37 of the potentiometer 35 is connected to the grid of a vacuum tube amplifier 38 through conductor 39 and it should be apparent that the plate current in the tube 38 will vary in accordance with the temperature at the point of weld since the change in potential developed across the resistance 35 by the thermo-couple 17 will be reflected in a voltage change at the tap 37 which is additive or subtractive to the negative biasing potential provided by the battery 36. A rectified and filtered plate current supply is furnished the tube 38 by a full wave rectifier 40 and a pi-section filter 41, the source of current being the transformer 40T having its primary connected to the line conductors L1 and L2. The voltage developed across the load resistor 42 in the plate circuit of the tube 38 is impressed on the grid of a second vacuum tube amplifier 43. A rectified and well filtered plate current supply for the tube 43 is furnished by the full wave rectifier 44 and the pi-section filter 45, the initial source being the transformer 44T which has its primary connected to the line conductors L1, L2.

A full wave rectifier 46 acting through the filter 47 furnishes a direct current biasing potential source across the conductors 48 and 49, which potential upon the closing of contactor 50 is impressed across the resistor 51. Contactor 50 may be part of a relay 52, the operating coil 53 of which is arranged to be energized from the control current source line under the control of a switch 54 which, in accordance with usual practice, may be pressure actuated to close upon the attainment of a predetermined pressure between the welding electrodes and the work. Another source of direct current biasing potential consisting of a rectifier 55, condenser 56 and load resistor 57 is provided and the normal direct current component of grid biasing potential for the discharge devices 20 and 21 upon the closing of contactor 50 is provided by the following circuit: Cathodes of devices 20 and 21, conductor 58, portion 59 of potentiometer 51, conductor 60, resistance 61, conductor 62, resistance 57, conductor 63, resistance 64, resistance 65, conductor 66, and through the secondary windings of the transformers T4 and T5 and the conductors 31 and 32 to the control grids of the discharge devices 20 and 21. Resistance 61 together with a second resistance 67 which is in series therewith is in the plate circuit of a gas filled discharge device 68 as is also the conductors 48 and 49. Normally, the device 68 is held non-conductive by the negative grid bias obtained from the negative end of resistor 57 and impressed through conductor 69, the secondary winding of transformer 70, and conductor 71.

Transformer 70 is of the impulse type, its primary being connected to the control current source line L1, L2 through the variable resistance 72 which is so adjusted that the peak of the output of the transformer will occur near zero voltage of the control current source. The impulse furnished by the transformer 70 to the conductor 71 in a positive direction overcomes the negative bias on the thyratron 68, causing it to conduct. There will now be developed a voltage across the series resistances 61 and 67 which is equal to the voltage impressed by the rectifier 46, 47 across the resistor 51 less the internal voltage drop across the discharge device 68.

Assuming there is 450 volts across the resistor 51 the drop across the resistances 61 and 67 will be 435 volts if the drop in tube 68 is 15 volts. If now rectifier 55 develops 80 volts across resistor 57 and the resistance 59 be adjusted to provide a drop of 200 volts between conductors 58 and 60 an adjustment of resistance 61 to provide a drop of 280 volts between the conductors 62 and 60 will result in zero voltage between the conductors 58 and 63. Upon conduction of tube 68 the alternating component of grid biasing potential furnished by the transformers T4 and T5 is operative to cause conduction in the devices 20 and 21 according to the phase relation of their grid-cathode voltages as determined by the phase shifting device 22.

Normal negative grid biasing voltage for the space discharge device 18 is furnished by a rectifier 72 having load resistor 73, the biasing circuit being traceable from the cathode, resistor 73, conductor 74, the primary of transformer T7, and the conductor 75 to the grid. The device 18 is thus held non-conductive until the discharge device 20 is rendered conductive and furnishes a positive bias wave to the primary of transformer T7. Upon conduction or "firing" of the device 18 the ignition electrode 76 of the valve 14 is energized through the circuit line conductor WL1, conductor 77, contactor 78 of relay 52, conductor 79, electrode 76, and mercury pool cathode of valve 14 to line conductor WL2, causing valve 14 to conduct. Likewise, conduction in the space discharge device 21 will overcome the negative grid bias of the control discharge device 19 made up by the rectifier 80 and the resistor 81 and impressed through conductors 82, 83 and 84. The positive biasing wave is impressed on the grid of device 19 through transformer T6 and upon operation or "firing" of the device 19 the ignition electrode 85 of the valve 13 will be energized through the circuit WL2, conductor 86, contactor 87 of the relay 52, conductor 88, electrode 85, mercury pool cathode 13, and line conductor WL1, causing valve 13 to conduct.

It will be noted that the equal series resistances 64 and 65 are in series with the source of the direct current component of the grid biasing voltage for the control devices 20 and 21 and it will be apparent that if the end terminals C and D of these resistances are at equal potential the balance of voltage in the conductors 58 and 62 (or 66) will not be disturbed. If however, a voltage drop should develop from D to C the direct current component of the biasing potential impressed on the grids of the control devices 20 and 21 will become more positive thus causing these devices to conduct earlier in the voltage half cycles thereby increasing the welding current supplied to the work. Conversely a voltage drop in the opposite direction will cause the devices 20 and 21 to conduct later in the voltage half cycles thereby diminishing the current passed through the work.

In accordance with the preferred and illustrated embodiment of the invention the rate of temperature rise is controlled by balancing the rate of potential rise at the point D against the rate of potential rise at the point C. It will be observed that the resistor 65 is in the plate circuit of the amplifier 43 through conductor 89, conductor 90, contactor 91 of relay 30, and conductor 92. As explained above, the plate current in amplifier 43 varies directly with the temperature of thermocouple 17 and it should be apparent that as the temperature rises the potential at point D becomes more negative. Means now to be described is provided to give a predetermined rate of potential drop at the point C.

Connected with conductor 48 is a conductor 93 and across this conductor 93 and the conductor 60 (which is a continuation of conductor 49) is a potentiometer 94, the adjustable tap of which is connected through conductor 95, contactor 96 of relay 52, conductor 97, and adjustable resistance 98, to the positive terminal of a capacitor 99. The negative end of capacitor 99 is connected to conductor 60 through conductor 100. Thus the rate of charge of the capacitor 99 upon the closing of contactor 96 is determined by the setting of the potentiometers 94 and 98. The potential attained by the postive terminal of capacitor 99 is impressed on the grid of an amplifier 101 through conductors 102 and 103. As shown, the resistance 64 is in the plate circuit of the amplifier 101 and it should be apparent that the point C will become progressively more negative as the grid potential becomes more positive at a rate determined by the rate of charging of the capacitor 99. If the thus determined rate of potential decrease at the point C leads the rate of potential decrease at the point D a potential drop will appear across D to C which drop is subtractive to the "negative" biasing potential impressed on the control grids of the control devices 20 and 21 thereby increasing the current supplied the welding load. Conversely a lag in potential decrease of the point C with respect to the point D will decrease the current supplied the welding load. It will be understood that the capacitor 99 will begin to charge immediately upon energization of coil 53 of relay 52 and to provide for the discharge of capacitor 99 upon completion of its cycle of operation the capacitor is shunted by a resistance 104 through conductor 105, contactor 106 of relay 52 and conductor 102. Thus at the start of each welding cycle the capacitor 99 is in a substantially discharged condition.

Coil 107 of the relay 30 is arranged to be energized from a secondary winding of transformer 23 through conductor 108, a controlled gas discharge device 109, conductor 110, contactor 111 of relay 52, conductor 112, and conductor 113. The electric discharge device 109 is normally held non-conductive by a large negative bias furnished its grid by the negative end of a load resistor 114 in the plate circuit of a normally conducting space discharge device 115. It will be observed that the grid of the control device 115 is controlled as to potential by the potential appearing at the adjusted tap of a potentiometer 116 which in turn is connected between ground and the lead 33 of the thermo-couple 17. When the temperature at the work or thermo-couple reaches the final desired welding temperature at time T1 as determined by the setting of potentiometer 116 the plate current in the discharge device 115 will go to zero or cut-off. This action removes the negative bias from the grid of device 109 causing the latter to conduct thereby energizing that circuit above outlined which includes the coil 107.

When relay 30 is actuated by energization of coil 107 one of its contactors 118 closes to short out the resistors 64 and 65 from the circuit which furnishes the direct current complement of grid biasing voltage to the control devices 20 and 21. At the same time contactor 91 opens to relieve the direct current voltage at the leads 90 and 92. Conductor 25 is disconnected from and conductor 26 is connected to the primary windings of the transformers T4 and T5 so that during this period a lesser value of current as determined by the phase angle of the voltage wave in conductor 26 is passed through the work. This value is fixed by preadjustment of the phase shifting device 22.

Having its negative terminal connected to the conductor 60 is a timing capacitor 120, the positive terminal of which is connected with the cathode of the gas discharge device 68 through an adjustable resistance 121, conductor 122, contactor 123 of relay 30, and conductor 124. Thus immediately upon the energization of relay 30 the voltage begins to build up on the capacitor 120 at a rate dependent on the setting of the potentiometer 121. The positive terminal of the capacitor 120 is connected to the control grid of a gas filled discharge device 125 and upon the capacitor attaining a predetermined charge, the device 125 will begin to conduct. Device 125 shunts that portion of the resistor 51 which is exclusive of the portion 59 and upon conduction it places a very high positive potential on the conductor 58 which in turn forces the grid bias of the control devices 20 and 21 highly negative thus enabling the grids to regain control and stop the flow of all welding current.

The above described operation of the timing capacitor 120 provides for an annealing period of predetermined duration and of predetermined current strength (as determined by the setting of the phase shifting device 22) immediately upon the attainment of the final desired welding temperature at the time T1. It should be apparent, however, that by suitable circuit modification it is readily possible, if desired, to cease all current flow at the time T1 until a lower proper annealing temperature is reached after which a flow of current is allowed for a predetermined time interval under the control of the temperature responsive device to maintain a constant temperature during the annealing interval. Also, relay 30 may be of a time delay type so that upon the attainment of the final desired welding temperature and the controlled interruption of the flow of welding current a measured time interval (T1—T2) may elapse before the relay 30 is pulled in and current flow (for annealing purposes) is re-established. The absence of current flow during this interval provides a cooling off period to enable the work to reach its proper annealing temperature.

Upon completion of the heat cycle of the welding or welding and annealing operation switch 54 is opened thereby de-energizing coil 53. The opening of relay 52 also de-energizes coil 107 of relay 30 thereby returning all the parts to their original ready condition in preparation for the next succeeding operation. When relay 30 is de-energized the timing capacitor 120 is discharged through conductor 127, normally closed contactor 128 of relay 30 and conductor 129.

It should be understood that many modifications may be made in the system herein specifically disclosed without detracting from the essential and desired mode of operation. For example, instead of controlling the reference rate of change of conduction in the amplifier 101 in accordance with the rate of charge of a timing capacitor the same may be accomplished in the manner shown in Figure 2. A tapped voltage dividing resistor 130 is connected in series with the variable resistance 131 and a contactor 132 of the relay 52 across the conductors 60 and 93. An arm 133 adapted to be driven at a predetermined rate of speed by a controlled speed motor 134 is arranged to connect the grid of the amplifier 101 with the taps of the resistor 130 in sequence.

From the foregoing description of the illustrated embodiments of the invention it is apparent that upon closure of switch 54 and energization of solenoid 53 of relay 52, contactors 78 and 87 connect the plate circuits of the firing tubes 18 and 19, respectively, with the ignition electrodes of the valves 14 and 13 while the contactor 50 connects the plate circuit of the gas discharge device 68 (including the series resistances 61 and 67) as well as the resistor 51 across the output of the rectifier 46, 47. As the voltage of the source next passes through zero in a positive direction the impulse from transformer 70 starts conduction in device 68 thereby building up potential across resistance 61 which, as outlined above, removes the negative biasing potential impressed on the grids of the control devices 20 and 21. This allows the alternating component of the biasing potential from the transformers T4 and T5 to cause conduction in the devices 20 and 21 according to the phase relation of their grid cathode voltages as determined by the setting of the phase shifting device 22.

If the quantity of energy passed as a result of the above alternating current biasing component is sufficient to effect the desired rate of temperature increase, terminals C and D of the resistors 64 and 65 remain at equal potential thus not effecting the period of conduction in the valves 13 and 14 during the half cycles of the alternating current source. However should the condition not remain stable the resistors 64 and 65 operate, as explained above, to superimpose either a negative or a positive increment of continuous biasing potential on the grid circuits of the devices 20 and 21 thus decreasing or increasing the length of the conduction periods.

The control illustrated operates in the above manner until the final desired welding temperature is reached at which time the output of amplifier 115 is sufficient to start conduction in the gas discharge device 109 thereby pulling in relay 30. Contactor 118 now removes resistors 64 and 65 from the grid biasing circuit for the control devices 20 and 21 and contactors 28 and 29 operate to shift the phase of the alternating current biasing source to decrease the length of the periods of conduction for annealing purposes. This annealing time is controlled by the rate of charging of the capacitor 120 and upon a predetermined potential being reached the gas discharge device 125 becomes conductive thereby shunting that portion of resistor 51 which is exclusive of portion 59 and making the potential in conductor 58 highly positive. This forces the grid bias of devices 20 and 21 highly negative and stops the flow of welding current. The opening of switch 54 de-energizes coil 53 of relay 52 the armature of which is spring returned to its open position. The opening of contactor 111 of relay 52 de-energizes coil 107 of relay 30 and consequently all the parts are thereupon restored to their initial condition of readiness preparatory to the initiation of the next succeeding welding operation.

It should now be apparent that we have provided an improved welding system which accomplishes, in a practical manner, the objects initially set out. By basing the welding current or heat control essentially on the rate of temperature increase of the work at the point of weld many normally uncontrollable factors affecting the final welding results and not heretofore compensated for are rendered ineffectual. In addition to the factors mentioned above, is the variation, in resistance welding, of current intensity at the point of weld due to the existence of shunt paths provided by previously welded spots. If the spots are close together the current flow will be more distributed thus decreasing the current intensity and rate of heating at the spot being welded. It should be observed, however, that the system of the invention, while automatically providing compensation for the various factors stated, nevertheless enables the successive welds to be accomplished in essentially constant and equal periods of time thus enabling the machine to operate at its most efficient rate of production.

The apparatus herein described is susceptible of wide modification within the scope and spirit of the invention, the apparatus being disclosed in detail merely for the purpose of illustrating the practical applicability of the invention, and reference should accordingly be had to the appended claims and the prior art in appraising the extent of the invention.

We claim:

1. The method of resistance welding which consists of applying welding electrodes to the work to be welded, supplying welding current to the electrodes, determining the temperature attained in the welding zone of the work by the flow of welding current therethrough, and controlling the strength of the welding current during the welding cycle in accordance with instantaneous values of said determined temperature whereby a predetermined rate of temperature rise in the welding zone of the work may be effected.

2. The method of welding hardenable steels which consists of applying welding electrodes to the work to be welded, supplying electric welding current of variable strength to the electrodes in accordance with instantaneous values of the temperature attained in the work during the welding cycle at the point of weld whereby a predetermined rate of temperature rise in the welding zone of the work is effected, interrupting said control when the final desired welding temperature is reached, and thereafter passing through the electrodes and work a current of less value than the current previously supplied to provide for the annealing of the metal in and adjacent to the zone of weld.

3. The method of welding hardenable steels which consists of applying electric current and pressure to the work to be welded, controlling the strength of the current in accordance with instantaneous values of the temperature attained in the work during the welding cycle at the point of weld whereby a predetermined rate of temperature rise in the welding zone of the work is effected, interrupting said control when the final desired welding temperature is reached, and thereafter passing through said zone and for a substantial length of time a current of less value than the current previously supplied to provide for the annealing of the metal in and adjacent to the zone of weld.

4. The method of welding hardenable steels which consists of applying electric current and pressure to the work to be welded, controlling the strength of the current in accordance with instantaneous values of the temperature attained in the work during the welding cycle at the point of weld whereby a predetermined rate of temperature rise in the welding zone of the work is effected, interrupting said control when the final desired welding temperature is reached, and thereafter passing through said zone and for a predetermined length of time a current of controlled and less value than the current previously supplied to provide for the annealing of the metal in and adjacent to the zone of weld.

5. The method of electric resistance welding which consists of applying electric current and pressure to the work at the point of weld, and during the welding cycle controlling the strength of current in accordance with instantaneous values of the temperature attained in the work at the point of weld.

6. The method of electric resistance welding which consists of applying electric current and pressure to the work at the point of weld, determining instantaneous values of the temperature attained at the point of weld, and controlling the strength of the current in accordance with the rate of temperature increase as determined from said values whereby a predetermined rate of temperature increase may be effected.

7. The method of electric resistance welding which consists of applying electric current and pressure to the work at the point of weld, determining instantaneous values of the temperature attained at the point of weld, controlling the strength of the current in accordance with the rate of temperature increase as determined from said values whereby a predetermined rate of temperature increase is effected until a final desired welding temperature is reached, and thereafter applying a current of less strength to effect the annealing of the metal at the point of weld.

8. The method of electric resistance welding which consists of applying electric current and pressure to the work at the point of weld, varying the strength of the current during the welding cycle in accordance with the rate of temperature increase in the work at the point of weld whereby a predetermined rate of temperature increase is effected until a final desired welding temperature is reached, then interrupting the flow of current until the metal at the point of weld has cooled to a proper annealing temperature, and thereafter applying current of proper strength to maintain said annealing temperature.

9. In a resistance welding system having a welding load circuit with an impedance factor, the method of automatically compensating for normally uncontrollable variations in said factor which consists of varying during the welding cycle the strength of the current furnished said circuit in accordance with the rate of the temperature rise in the work at the point of weld.

10. In a resistance welding system employing an intermittent source of welding energy and having a welding load circuit with an impedance factor, the method of automatically compensating for normally uncontrollable variations in said factor which consists of furnishing controlled portions of the energy in each energy source impulse to the welding load circuit, and varying said portions in accordance with the rate of temperature rise in the work at the point of weld.

11. A welding system having a welding load circuit adapted to be connected to an alternating current source, a pair of oppositely connected electric valves interposed between said source and circuit, each of said valves having a control electrode and a plurality of principal electrodes, means to conduct energizing current to said control electrodes, means to control the flow of current to said control electrodes in proper timed sequence to condition said valves for conduction during at least a portion of each half cycle of the source current comprising a pair of space discharge devices each having a control electrode, and a source of biasing potential for said last mentioned control electrodes comprising means for varying the biasing potential in response to the rate of temperature increase in the metal being welded.

12. A welding system having a welding load circuit connected to an alternating current source through space discharge means operative to conduct current to said circuit in half cycle increments, and means responsive to the rate of temperature increase in the metal being welded to control the time in the half cycles at which said discharge means becomes conductive.

13. A welding system having a welding load circuit connected to an alternating current source through space discharge means operative to conduct current to said circuit in half cycle increments, control means for said space discharge means to determine the time in the half cycles at which the space discharge means becomes conductive, said control means comprising a space discharge device having an alternating anode-cathode potential in phase with said source, said discharge device having a control electrode, and means responsive to the temperature attained in the metal being welded in control of the potential furnished said control electrode whereby the quantity of energy conducted to said circuit during each half cycle of said source is varied in accordance with said temperature.

14. A welding system comprising a source of electric welding energy, a welding load, modulating means to control the strength of welding current furnished said load from said source, means to determine the temperature attained in the work at the point of weld, means operative to provide a reference factor variable according to time, and means to control the operation of said modulating means in accordance with the relation of said temperature to said factor during each succeeding increment of time.

15. A welding system comprising a source of electric welding energy, a welding load, modulating means to control the strength of welding current furnished said load from said source, means responsive to the temperature attained in the work at the point of weld, means including a timing capacitor to provide a reference factor variable according to time, and means responsive to variation in differential between said factor and temperature to control said modulating means.

16. Apparatus according to claim 14 further including means to render said last named means to control inoperative upon a predetermined temperature being reached.

17. Apparatus according to claim 14 further including means to render said last named means to control inoperative upon a predetermined temperature being reached, a second timing device, and means operative after said predetermined temperature is reached to render said modulating means conductive for a predetermined interval of time as determined by said second timing device.

18. A welding system comprising a source of electric welding energy, a welding load, modulating means to control the strength of welding current furnished said load from said source, an electronic discharge device having an anode, a cathode and a control element in control of the operation of said modulating means, component direct and alternating current sources of biasing potential for said control element, means to apply said direct current component during a portion of a complete welding cycle and in accordance with the instantaneous temperatures attained at the point of weld, and means to apply said alternating current component during a latter portion of said complete welding cycle.

19. In a resistance welding system, the method of automatically compensating for normally uncontrollable variations in the intensity of the flow of heating current at the point of weld as caused by the presence in the work of previously made welds providing shunt paths, for example, which consists of varying during the welding cycle the strength of the current furnished the welding circuit in accordance with changes in the instantaneous values of the temperature actually attained in the work at the point of weld at any particular time during the welding cycle.

20. Welding control apparatus comprising in combination means to modulate the flow of welding current to the welding load, and means comprising means responsive to instantaneous values of the temperature attained in the welding zone during the welding and also comprising means providing a time reference factor to control said modulating means whereby a predetermined time-welding temperature relation is maintained throughout at least a substantial portion of the welding cycle.

21. The method of electric resistance welding which consists of applying welding pressure to the work at the point of weld, supplying heating current to the zone of weld, and varying the intensity of said current in relation to time and to instantaneous values of the temperature attained in said welding zone during the welding cycle to maintain a predetermined time-welding temperature relation throughout at least a substantial portion of the welding cycle.

22. The method of welding hardenable steels which consists of applying welding pressure to the work at the point of weld, supplying heating current to the weld, modulating said current in accordance with instantaneous values of time and in accordance with the temperature attained in the zone of weld during the welding cycle whereby a predetermined time-temperature relation is attained throughout the welding cycle, interrupting said heating current upon the welding zone attaining a predetermined maximum temperature, and thereafter applying an annealing current to the zone of weld.

23. A welding system comprising a welding load circuit, a source of welding energy, means to modulate the flow of energy from said source to said circuit, grid controlled space discharge apparatus in control of said modulating means, and means to control the grid bias on said apparatus comprising means establishing a potential variable according to time and means establishing an opposing potential variable in accordance with the instantaneous welding temperature attained.

24. A welding system comprising a welding load circuit, a source of welding energy, means to modulate the flow of energy from said source to said circuit, grid controlled space discharge apparatus in control of said modulating means, and means to control the grid bias on said apparatus comprising means establishing a potential variable according to time and means establishing an opposing potential variable in accordance with a welding condition, said source being aperiodic and further including means to impress on said grid biasing potential a periodic component of the same frequency as said source, and means to vary the phase relation of said component with respect to said source.

25. A welding system comprising a welding load circuit, a source of welding energy, means to modulate the flow of energy from said source to said circuit, grid controlled space discharge apparatus in control of said modulating means, means to control the grid bias on said apparatus comprising means establishing a potential variable according to time and means establishing an opposing potential variable in accordance with the temperature attained at the point of weld, and means to interrupt said flow of energy upon said temperature reaching a predetermined maximum value.

26. A system according to claim 25 further characterized in that said source is aperiodic and further including means to impress on said grid biasing potential a periodic component of the same frequency as said source, and means to vary the phase relation of said component with respect to said source.

27. A welding system comprising a welding load circuit, a periodic source of welding energy, means to modulate the flow of energy from said source to said circuit, grid controlled space discharge apparatus in control of said modulating means, means to control the grid bias on said apparatus comprising means establishing a potential variable according to time and means establishing an opposing potential variable in accordance with the temperature attained at the point of weld, means operable upon said temperature reaching a predetermined value to render ineffectual both said establishing means, and means operable after said predetermined temperature is attained to impress on said apparatus a biasing wave of the same frequency as said source and having controlled phase relation with respect thereto.

28. A welding system comprising a welding load circuit, a source of welding energy, means establishing a time factor, means responsive to the temperature attained at the point of weld, means including said establishing means and said responsive means to modulate the flow of energy from said source to said circuit to maintain a predetermined time-temperature relation, means to control said modulating means to provide for the flow of annealing current upon the completion of the weld, a time delay device, a timer, and means responsive to said temperature reaching a predetermined maximum value to initiate operation of said delay device, and means operable upon said device timing out its period to render effectual said annealing current control means, said timer being operative to determine the duration of the annealing period.

JOSEPH H. COOPER.
CLYDE E. SMITH.